US012681491B2

(12) United States Patent
Jäger et al.

(10) Patent No.: US 12,681,491 B2
(45) Date of Patent: Jul. 14, 2026

(54) METHOD AND SYSTEM FOR AUTONOMOUS EXPLORATION AND SCANNING

(71) Applicant: HEXAGON GEOSYSTEMS SERVICES AG, Heerbrugg (CH)

(72) Inventors: Andreas Jäger, Zürich (CH); Lukas Schmid, Zürich (CH); Marko Panjek, Zürich (CH); Cédric De Crousaz, Zürich (CH); Giacomo Manzoni, Zürich (CH)

(73) Assignee: HEXAGON GEOSYSTEMS SERVICES AG, Heerbrugg (CH)

( * ) Notice: Subject to any disclaimer, the term of this patent is extended or adjusted under 35 U.S.C. 154(b) by 8 days.

(21) Appl. No.: 18/952,915

(22) Filed: Nov. 19, 2024

(65) Prior Publication Data

US 2025/0165001 A1 May 22, 2025

(30) Foreign Application Priority Data

Nov. 20, 2023 (EP) .................................... 23210867

(51) Int. Cl.
    G05D 1/246 (2024.01)
    G05D 1/242 (2024.01)
    (Continued)

(52) U.S. Cl.
    CPC .......... G05D 1/2465 (2024.01); G05D 1/242 (2024.01); G05D 2105/87 (2024.01); G05D 2109/254 (2024.01); G05D 2111/17 (2024.01)

(58) Field of Classification Search
    CPC .. G05D 1/2465; G05D 1/242; G05D 2105/87; G05D 2109/254; G05D 2111/17;
    (Continued)

(56) References Cited

U.S. PATENT DOCUMENTS

| | | | | |
|---|---|---|---|---|
| 2018/0188733 A1* | 7/2018 | Landola | ................. | G05D 1/024 |
| 2021/0263515 A1* | 8/2021 | Henry | .................... | G06T 17/00 |

(Continued)

FOREIGN PATENT DOCUMENTS

| | | |
|---|---|---|
| EP | 4 141 474 A1 | 3/2023 |
| WO | 2020/014740 A1 | 1/2020 |
| WO | 2022/268316 A1 | 12/2022 |

OTHER PUBLICATIONS

Surmann, H. et al., "An autonomous mobile robot with a 3D laser range finder for 3D exploration and digitalization of indoor environments," Robotics and Autonomous Systems, vol. 45, pp. 181-198 (2003).

(Continued)

*Primary Examiner* — Tarek Elarabi
*Assistant Examiner* — Preston Jay Miller
(74) *Attorney, Agent, or Firm* — Maschoff Brennan

(57) ABSTRACT

A computer-implemented method for autonomously exploring, by a mobile robot, one or more objects of interest, the mobile robot comprising a computing unit and a laser scanner module for scanning surfaces of the one or more objects of interest, the laser scanner module having a field of view. The method comprising defining a 3D exploration map, wherein the one or more objects of interest are situated in the exploration map, partitioning the exploration map into a multitude of 3D exploration blocks, and an autonomous exploration of the exploration map by means of the mobile robot, wherein the exploration comprises, by the laser scanner module, generating scan data related to a point cloud while the mobile robot is travelling along an exploration path.

20 Claims, 13 Drawing Sheets

(51) Int. Cl.
  *G05D 105/80* (2024.01)
  *G05D 109/25* (2024.01)
  *G05D 111/10* (2024.01)

(58) Field of Classification Search
  CPC ........ G05D 1/2464; G05D 1/46; G05D 1/246;
                                G05D 1/65; G05D 2109/20
  See application file for complete search history.

(56) References Cited

U.S. PATENT DOCUMENTS

2021/0278834 A1* 9/2021 Kendoul .............. G05D 1/0044
2025/0383216 A1* 12/2025 Huang ............... G01C 21/3804

OTHER PUBLICATIONS

Joho, D. et al., "Autonomous Exploration for 3D Map Learning,"
Autonome Mobile Systeme 2007, (2007).
Batinovic, A. et al., "A Multi-Resolution Frontier-Based Planner for
Autonomous 3D Exploration," arxiv.org, (Nov. 4, 2020).
Extended European Search Report dated Mar. 18, 2024 as received
in Application No. 23210867.0.

* cited by examiner

METHOD AND SYSTEM FOR AUTONOMOUS EXPLORATION AND SCANNING

BACKGROUND

The disclosure generally relates to a mobile robot, particularly an unmanned aerial vehicle (UAV), comprising a laser scanner module for scanning surfaces of objects of interest. More specifically, the disclosure pertains to a method and system for autonomous exploration and scanning of objects of interest by one or more mobile robots.

UAVs are being developed to manage a wide variety of tasks in technical and non-technical fields: Recording movie scenes, freight transportation, inspection of buildings and technical installations, as well as surveying, measuring and/or digitizing of physical environments. For instance, WO 2022/268316 A1 discloses a rotary wing drone type UAV having a laser scanner module for inspecting, surveying, measuring and digitizing the UAV's environment. Such a UAV is a flying laser scanner that can reach locations not accessible for stationary scanners (like rooftops, trees, building facades etc.) and can scan its surrounding during the flight. It would be advantageous to facilitate inspection, surveying, measuring and digitizing of objects of interest. It would be particularly advantageous, if the UAV could explore the object fully autonomously, i.e., without the need for any user interaction after an initial definition of the UAV's operating area.

Existing methods for autonomous or semi-autonomous scanning exploration by UAVs usually work well for simple (e.g., box shaped) objects, but struggle with objects that have complex surfaces, e.g., bridges, or buildings including canopies or complicated façades. Often, a scan of such a complex object will leave scan shadows and/or take excessive time to be completed. Since the battery of UAVs is a limiting factor, efficient use of the provided power during exploration is important.

SUMMARY

It is therefore an object of the present disclosure to provide an improved method and system for scanning surfaces of objects of interest.

It is a particular object to provide such a method and system that allow a UAV or other mobile robot to perform the scanning fully autonomously.

It is a particular object to provide such a method and system that allow a UAV or other mobile robot to autonomously explore a user-defined volume comprising the objects of interest.

A first aspect pertains to a computer-implemented method for autonomously exploring, by a mobile robot, one or more objects of interest, the mobile robot comprising a computing unit and a laser scanner module for scanning surfaces of the one or more objects of interest, the laser scanner module having a field of view (FOV). The method comprises:

defining a three-dimensional exploration map, wherein the one or more objects of interest are situated in this exploration map;
    partitioning the exploration map into a multitude of three-dimensional exploration blocks; and
    an autonomous exploration of the exploration map by means of the mobile robot, which comprises, by the laser scanner module, generating scan data related to a point cloud while the mobile robot is travelling along an exploration path.

According to this aspect, exploring an exploration block at least comprises determining, whether the respective exploration block comprises one or more points of the point cloud, the computing unit of the mobile robot updating the exploration map and defining the exploration path.

According to some embodiments, the mobile robot is an unmanned aerial vehicle (UAV), for instance a quadcopter drone.

According to some embodiments, the FOV depends on a position and orientation of the UAV and is limited by a position and orientation of the laser scanner module relative to the UAV, and by a pre-defined radius that is smaller than a maximum scanning range of the laser scanner module. For instance, the maximum scanning range of the laser scanner module can be between 15 and 150 metres, particularly between 40 and 80 metres.

In some embodiments, the FOV is also limited by a position and orientation of the laser scanner module relative to other features of the UAV (e.g., rotors and wings).

According to some embodiments, updating the exploration map is performed in time intervals that are selected depending on at least one of a scanning speed of the laser scanner unit, a computing speed of the computing unit, and a current speed of the mobile robot. For instance, these time intervals could be between 100 ms and 1 s.

According to some embodiments, updating the exploration map comprises, at each of a multitude of distinct points in time:

retrieving scan data generated by the laser scanner module;
    identifying, based on the retrieved scan data, exploration blocks that lie at least partly in a past FOV and comprise one or more points of the point cloud (the past FOV being the FOV of the laser scanner module of a previous point in time that precedes the respective point in time of the multitude of distinct points in time);
    defining the identified exploration blocks as occupied blocks;
    extracting cone information for each of the occupied blocks that lie at least partly in the past FOV, the cone information relating to a cone defined by a position of the laser scanner module at the respective previous point in time and by boundaries of the respective occupied block;
    extracting cone information for each unexplored block that fully lies in the past FOV, the cone information relating to a cone defined by a position of the laser scanner module at the respective previous point in time and by boundaries of the respective unexplored block; and
    determining for each of the unexplored blocks that lie fully in the past FOV, based on the cone information of the respective unexplored block and on the cone information of the occupied blocks that lie at least partly in the past FOV, whether a line of sight between a centre of the past FOV and at least a part of the respective unexplored block is blocked by one or more occupied blocks.

In some embodiments, determining whether a line of sight is blocked comprises determining whether the cone of the respective unexplored block overlaps with one or more cones of the occupied blocks, and if it overlaps, determining whether a distance from the centre of the past FOV to the centre of the respective unexplored block is bigger than a distance from the centre of the past FOV to the centre of the respective occupied block.

According to some embodiments, information regarding a minimum distance and a direction to the nearest occupied block or nearest point of the point cloud is stored for each exploration block, and updating the exploration map further comprises for each block that has been defined as occupied block in the latest distinct point in time, determining a distance and direction between the respective occupied block and each not occupied exploration block in a defined radius around the respective occupied block; and if the determined distance is smaller than the stored minimum distance for that block, updating the stored minimum distance and direction with the determined distance and direction.

For instance, the radius may be defined based on a maximum or optimal scanning range of the laser scanner module and/or on a size of the multitude of 3D exploration blocks.

According to some embodiments, updating the exploration map further comprises defining unexplored blocks that lie fully in the past field of view, the cone of which unexplored blocks do not overlay with one or more cones of the occupied blocks, as free blocks, and defining free blocks that border unexplored blocks as frontier blocks. In these embodiments, defining the exploration path comprises assigning scores to the frontier blocks, and assigning a next exploration target for the mobile robot based on the scores assigned to the frontier blocks, for instance wherein the highest-scored frontier block is assigned as next exploration target. A block can be also set to free if the cones overlay, but the unexplored block is in front of the occupied block.

For instance, the scores are assigned based on a distance between the respective frontier block and one or more occupied blocks, an overall distance and/or a relative vertical distance between the respective frontier block and a current position of the UAV, and/or based on a number of occupied blocks within a defined radius around the respective frontier block.

According to some embodiments, defining the exploration path comprises defining a subset of free blocks that are not frontier blocks as scan-target blocks, and assigning scores also to the scan-target blocks. In these embodiments, assigning the next exploration target for the mobile robot is based on the scores assigned to the frontier blocks and on the scores assigned to the scan-target blocks, wherein the highest-scored block is assigned as next exploration target. For instance, scores are assigned to the scan-target blocks based on their position relative to a surface of the object of interest and its potential for providing good scanning results.

According to some embodiments, assigning the scores comprises assigning frontier scores to the frontier blocks and assigning scan-target scores to the scan-target blocks, wherein a first weight is multiplied with each of the frontier scores and a second weight is multiplied with each of the scan-target scores. Optionally, the first and second weight may be user-selectable.

According to some embodiments, defining the scan-target blocks comprises defining, for each occupied block, a multitude of surface-scan cones, and determining, for each free block which centre point is located in a surface-scan cone, whether a line of sight to a part of the respective occupied block is blocked. Those free blocks, which centre points are located in a surface-scan cone and which lines of sight to the respective occupied block are not blocked, are then defined as scan-target blocks. In some embodiments, a surface-scan cone is flagged as explored when a centre of the FOV enters the respective surface-scan cone.

According to some embodiments, a 3D volume is defined by a user as the 3D exploration map in a graphical user interface (GUI), which, e.g., may be displayed on a screen of a mobile computing device, showing a 2D representation of the one or more objects of interest. For instance, the GUI may allow the user to define a polyhedron, in particular a cuboid, as the three-dimensional exploration map by marking two corner points of the cuboid.

According to some embodiments, exploring an exploration block comprises scanning, by the laser scanner module—e.g., with a user-defined scanning accuracy-, surfaces of objects present in the exploration block. For instance the one or more objects of interest comprise buildings or other man-made structures (the surfaces including at least one of façades, roofs, pillars and pavement) and/or natural objects or scenes, such as caves.

A second aspect pertains to a UAV comprising a computing unit and a laser scanner module, the laser scanner module having an FOV, wherein the computing unit is configured to receive a 3D exploration map or information about that allows computing the 3D exploration map (i.e., at least volume coordinates), wherein the one or more objects of interest are situated in the exploration map and wherein the exploration map is partitioned into a multitude of three-dimensional exploration blocks;

the UAV is configured to perform, based on the received exploration map, an autonomous exploration of the exploration map—for instance according to the method of the first aspect—, wherein the exploration of the exploration map comprises the laser scanner module generating scan data while the UAV is travelling along an exploration path, the scan data relating to a point cloud, exploring an exploration block at least comprises determining, based on the scan data, whether the respective exploration block comprises one or more points of the point cloud; and the computing unit of the UAV is configured to update the exploration map and to define the exploration path.

A third aspect pertains to a system for scanning surfaces of one or more objects of interest, the system comprising a UAV according to the second aspect and a mobile computing device, wherein the mobile computing device is configured to receive user-input defining a 3D exploration map, wherein the one or more objects of interest are situated in the exploration map, and to provide information about the exploration map to the UAV. The system may be configured to perform a method according to the first aspect.

A fourth aspect pertains to a computer program product comprising program code having computer-executable instructions for performing, in particular when run in a computing unit of a UAV according to the second aspect, the method according to the first aspect.

BRIEF DESCRIPTION OF THE DRAWINGS

Aspects will be described in detail by referring to exemplary embodiments that are accompanied by figures, in which.

DETAILED DESCRIPTION

Figure 1:
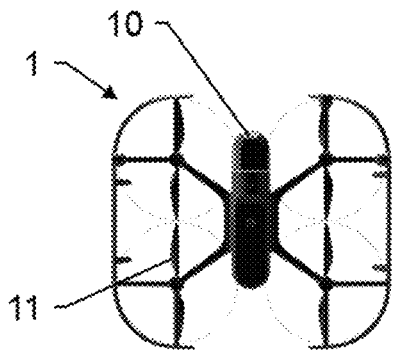
FIG. 1 shows an exemplary embodiment of a UAV.

FIG. 1 shows an exemplary embodiment of an unmanned aerial vehicle (UAV) 1 as an example of a mobile robot. The shown UAV 1 is a rotary wing drone type UAV having four rotors. The UAV 1 comprises a laser scanner module 10 (such as a Lidar module) that is configured for inspecting, surveying, measuring and digitizing the UAV's environment. As shown here, the laser scanner module 10 may comprise one single laser scanner. Alternatively, two or more laser scanners may be provided at different locations on the UAV 1.

Additional sensors may be provided on the UAV 1. Multiple sensors may be used to prevent collision with objects. These sensors may include the laser scanner module 10. Also, radar sensors might be used (e.g., mounted on the left, on the right and in the rear of the shrouding). For instance, camera sensors that allow navigating through an environment without colliding with obstacles, e.g., with objects of interest or other objects in an exploration area, may be provided. The sensors may be configured to perform a simultaneous localization and mapping (SLAM) functionality while the UAV moves through the exploration area. For instance, the cameras may be used for state estimation of the UAV (visual inertial odometry). Optionally, cameras capturing colour images may also allow adding more information to the scan, in particular colourization of points in the point cloud.

Figure 2:
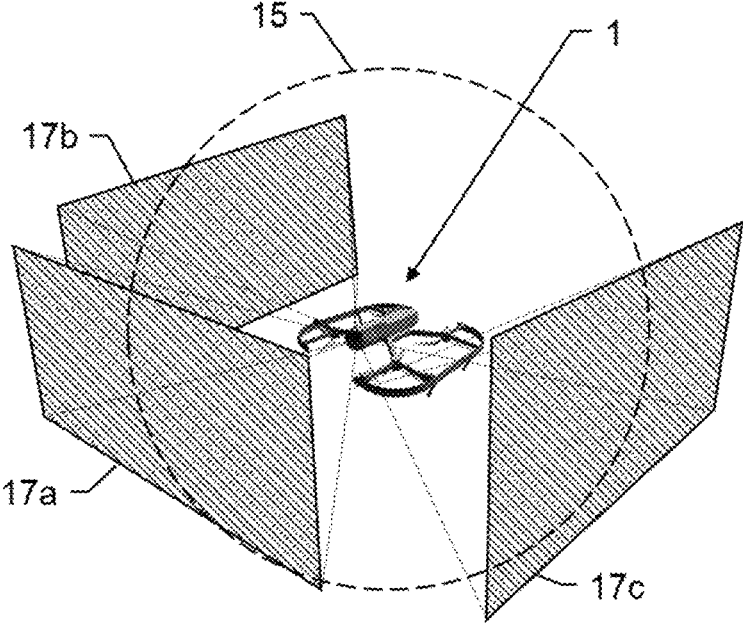
FIG. 2 shows the fields of view of the sensors of the UAV of FIG. 1.

FIG. 2 illustrates the UAV 1 with its sensor's several fields of view (not true to scale). In the shown example, three camera sensors, each having a camera field of view 17a-c are provided on the UAV 1. Other camera setups may include more cameras, e.g., also pointing upwards and downwards. Depending on its setup and position on the UAV, the laser scanner unit may have a spherical or basically spherical field of view 15. However, some parts of the field of view will usually be obstructed by other parts of the UAV, such as the body and the rotors. Optionally, such obstructions may be prevented or reduced by a laser scanner unit comprising two or more separate laser scanners.

Figure 3:
FIG. 3 shows a mobile computing device as part of an exemplary embodiment of a system, allowing a user to define a volume as a 3D exploration map.

FIG. 3 shows a mobile computing device 2 for use with the UAV of FIG. 1. For instance, the device 2 may be configured as a tablet computer, a smartphone or a laptop computer. It comprises means for wireless data exchange with the UAV. These means may include one or more of Bluetooth, WiFi and mobile (cellular) radio. The device 2 comprises a screen 20 (e.g., configured as a touchscreen) that provides a graphical user interface (GUI). In the shown embodiment, the GUI shows a 2D map of a surrounding, wherein the surrounding comprises one or more objects of interest, such as houses, bridges or churches, that a user wants to be scanned by the UAV.

The GUI allows a user to define a three-dimensional exploration map 3 as a volume enclosing the object or objects of interest. Information regarding this volume 3, in particular its 3D coordinates, are provided via the wireless data connection to the UAV, which then autonomously explores the volume 3 while scanning the scene inside including the objects of interest in an optimal manner. For instance, a software application (app), which is installed on the device may provide the GUI, receive the user input regarding the volume 3 and establish the wireless data connection with the UAV.

The volume 3 can be defined, e.g., by marking the top-down view area containing the object(s) of interest on the 2D map view and then defining the height of the volume with a slider.

The volume 3 can be polygonal. Also, any other form of volume definition could be used, e.g., a volume could be selected based on an existing point cloud or a CAD model or any other 3D model. For instance, after selecting the boundary of the volume on the 2D map, i.e., the latitude and longitude coordinates, the user may then define the height of the volume. By default, the bottom of the volume can be set to the altitude of the UAV before takeoff. If needed, the user may also move the volume up or down, to change the global vertical position of the volume (e.g., using a slider).

Figure 4:
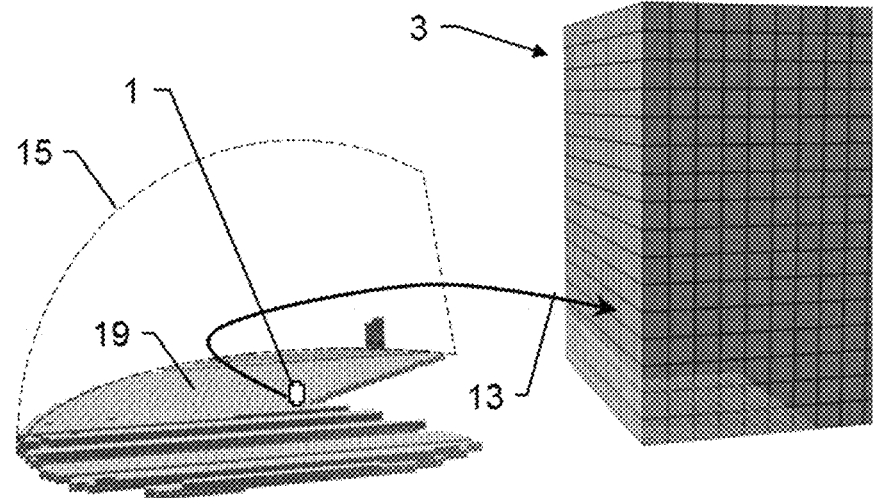
FIG. 4 illustrates the beginning of an exemplary exploration and scanning process by the UAV in the defined volume.

Of course, the exploration volume may be also defined in a 3D view. For instance, when loading a 3D pre-scan of one or multiple objects, an exploration volume could be defined around them (i.e., in the 3D view) in order to scan them. The same could be applied when loading a BIM or CAD model FIG. 4 shows the beginning of an exploration and scanning process by the UAV 1. For instance, once the volume has been defined, the user presses the "start exploration"-button on the mobile device and the UAV 1 will autonomously explore the volume content and scan the objects within it in an optimal way without any need for user interaction.

By using its laser scanner unit, the UAV 1 can perceive its environment in a spherical volume around it. It can therefore build up its own map 19 of the environment. The volume ("exploration map") 3 defined by the user is automatically divided into a multitude of blocks ("exploration blocks"). In the shown example, the UAV 1 is outside of the volume 3 at the beginning of the process. As can be seen in FIG. 4, features inside the field of view 15 of the UAV's laser scanner unit have already been captured as a map 19 of the environment. The UAV 1 determines its actual position—e.g., its absolute position or its position relative to the volume 3—and calculates a flight path 13 to approach the volume 3.

Initially, the volume 3 is unknown space for the UAV 1. Once the field of view 15 of the UAV's laser scanner enters the volume, unknown space will be set to either free or occupied, depending on whether the laser scanner detects objects inside the respective exploration block. In this context, the term "field of view" relates to the 3D area visible by the laser scanner from a certain position and orientation at a given point in time. While flying, the exploration map is continuously updated. An "exploration path planner" uses the continuously updated exploration map 3 to decide the optimal next flying destination for exploring the volume content and scanning the objects of interest.

Although the embodiments illustrated here show the use of a UAV, also other kinds of mobile robots can be used with the method. For instance, the scanner unit (e.g., comprising a Leica BLK ARC Autonomous Laser Scanning Module) could be provided on a wheeled vehicle (unmanned ground vehicle, UGV) or on a walking robot. Especially if the object of interest is flat or can be accessed by ramps or stairs, the use of a UAV may not be necessary. If the object of interest is the interior of a building, UGVs or walking robots may even be advantageous over a UAV. To allow collaborative exploration, the exploration map may be hosted on the cloud and updated by scanner units of multiple UAVs or other mobile robots. The multiple UAVs or other mobile robots would then regularly retrieve the latest exploration map status and plan their trajectories accordingly.

Figures 5A, 5B:
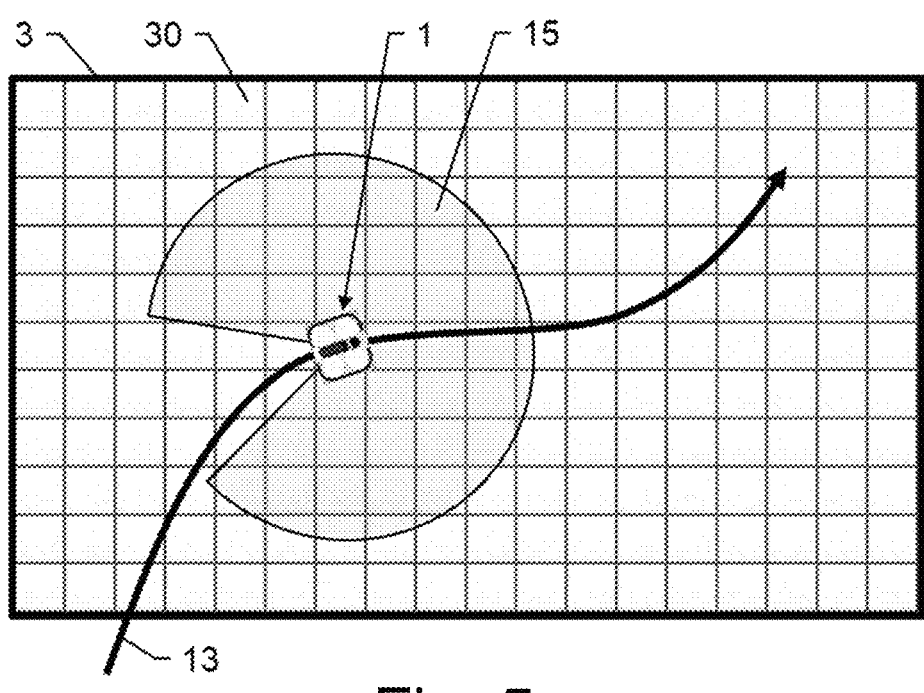
FIGS. 5a-b show the UAV moving through the volume.

FIGS. 5a and 5b illustrate the process after the UAV 1 has reached the volume 3. For reasons of clarity, the exploration map 3 is shown here in a 2D sectional view, with one layer of exploration blocks 30 appearing as a grid squares. The UAV 1 is shown in a top view moving along its path 13 through the exploration map 3, capturing 3D data of its surrounding inside the laser scanner's field of view 15 and computing 3D positions of objects based on the captured 3D data. Note that the field of view used to update the exploration map 3 does not necessarily need to be exactly aligned with the physical field of view of the laser scanner; the used field of view must be included in the physical field of view.

The exploration map 3 is overlaid on top of the "global main occupancy map", i.e., the map which is built up during the flight of the UAV 1 and comprises 3D information regarding detected objects that has been captured by the UAV's laser scanner module. This occupancy map also may be used for obstacle avoidance. Each exploration block 30 can be marked "occupied", "free" or "unknown", depending on whether or not 3D data has been detected inside the block 30. Initially, all exploration blocks are set to unknown.

FIG. 5b illustrates using information gathered at a previous point in time for updating the exploration map. The UAV 1 moves through the volume 3 continuously, i.e., without stopping for capturing the 3D data. The laser scanner performs about 240.000 measurements per second, thus needing a few milliseconds to cover a full spherical field of view 15. Additionally, processing the scan data and incorporating it into the global occupancy map will also take some milliseconds.

Internally, the measurements are forwarded to an occupancy map framework. In case of a valid lidar measurement, the respective voxel of the occupancy map is set to occupied, thereby building up the global occupancy map. This occupancy map is consistent, i.e., it keeps the latest occupancy information seen.

The sampling of the whole spherical volume of the lidar field of view 15 and the internal processing of the lidar data for updating the occupancy map takes some milliseconds. If the current field of view 15 would be used for every exploration-map update, the occupancy map in the field of view 15 often would not be up to date. Therefore, the exploration-map update is performed using a field of view

15' from the past (e.g., a few milliseconds ago). This ensures that the occupancy map is up to date in the volume of the past field of view 15'.

The occupancy map information is used to define if an exploration block is occupied or not, as the occupancy map and exploration map are overlaid. To make sure that the occupancy map is up-to-date and contains the complete occupancy information, the exploration map update is evaluated and performed using the field of view 15' of a few hundred milliseconds ago (past FOV). That is, the newly received 3D positions might not be the ones as seen from the pose of the UAV at the actual point in time to, but those observed at a previous point in time t–1. The time lag between these two points in time to, t–1, may be selected depending on the measurement and computation speed. The time lag leads to a positional offset 14 between the actual position of the UAV 1 and its position 1' at the previous point in time t–1.

Figure 6A:
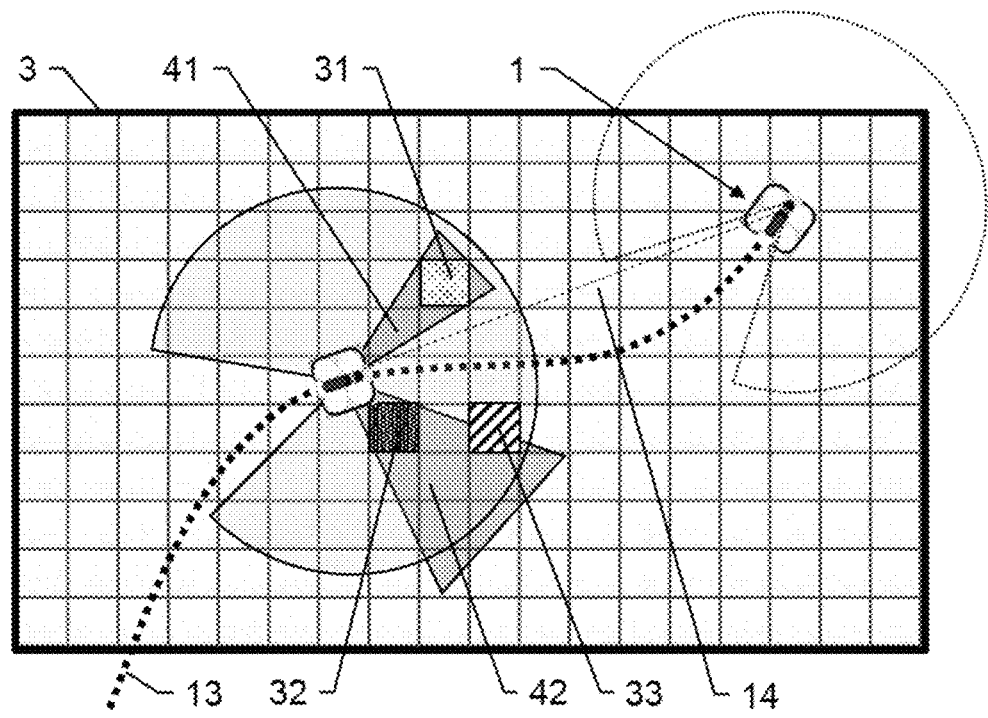
FIGS. 6a-c illustrate an exemplary process of updating the exploration map.
Figure 6B:
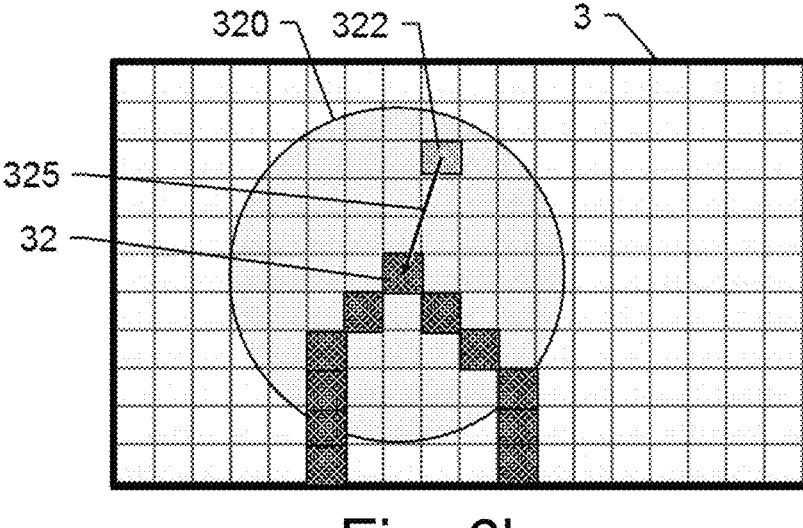
Figure 6C:
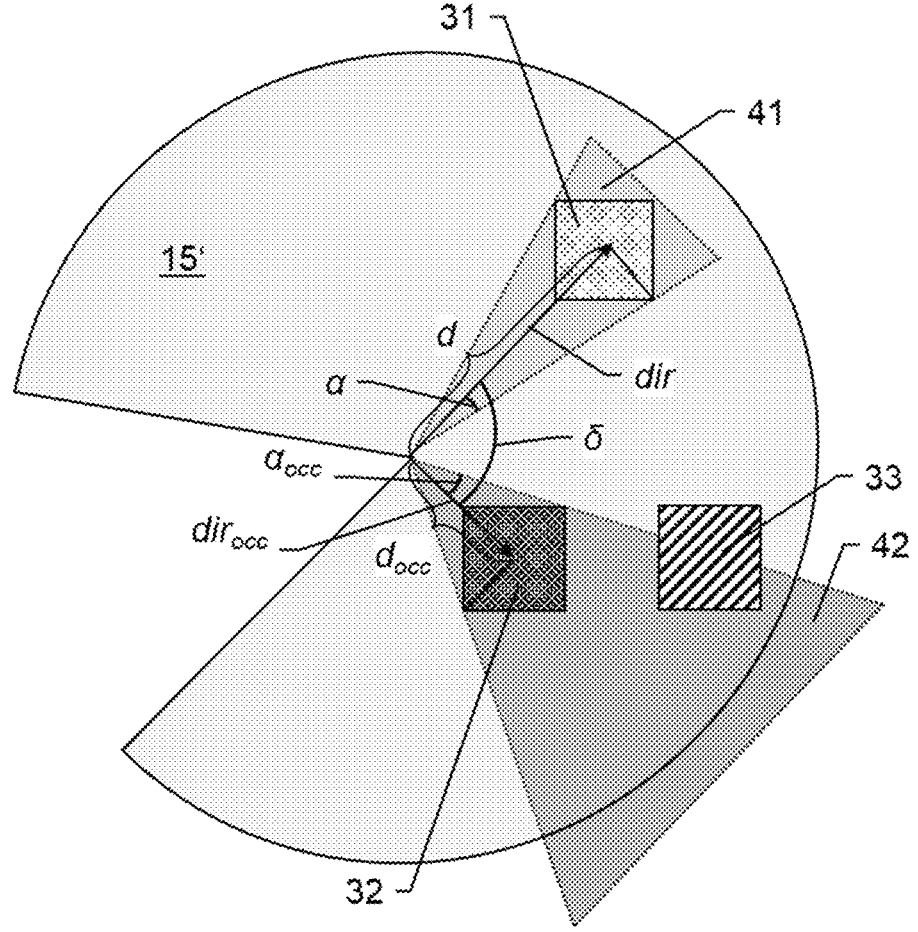

FIGS. 6a-c illustrate the process of updating the exploration map 3. The exploration map update procedure, which is described in the following, is performed regularly during the exploration process, for instance every 500 ms. Alternatively, the exploration map update procedure can be performed in an asynchronous fashion, e.g., in a frequency depending on a current flight speed, where the no updates are performed if the UAV does not move, and the more frequent updates are performed the faster the UAV is moving.

As described above with respect to FIG. 5a, computation of an up-to-date map of the environment (an up-to-date occupancy map) requires some time (e.g., up to one second), in which time the UAV 1 does not stop but continues travelling along its path 13 through the map 3. Consequently, also the step of updating the exploration map 3 will often have to be performed based on data from a previous point in time, i.e., captured at different positions. This is illustrated in FIG. 6a.

Information regarding the laser scanner's past field of view 15' of the previous point in time (e.g., 500 ms ago) is received. This information may comprise pose information regarding the position and orientation and/or an extent of the past field of view 15'. This ensures that the global main occupancy map of the UAV 1 is up to date in the field-of-view volume. Since the laser scanner scans from a center of its field of view 15 in a dome-like fashion, each exploration block 30 inside the (past) field of view 15, 15' defines a cone 41, 42, in particular a right circular cone. Each cone is defined by a direction dir of its central axis and by a half aperture angle α.

Computing cones is only an approximation, but it can be used to be computationally efficient and to allow evaluation in real time even on platforms with limited computational power. Of course, instead of using cones one could also define a volume aligned with the rays of the corner points of the block. Although being more accurate, this solution would require more computational effort.

All those exploration blocks 30 that overlay with occupied blocks of the global occupancy map (main map) and lie completely or partly within the field of view 15' are marked as occupied blocks 32. Among other information, every exploration block 30 can store the distance and direction to the closest occupied block 32 in its neighborhood.

As illustrated in FIG. 6b, during each exploration map update procedure, for each exploration block 30, the stored distance and direction to the closest occupied block 32 may be updated. Alternatively, the stored distances and directions may be updated whenever a block is marked as occupied in a specific surrounding. Also, there is no need to update the stored distance and direction for already existing occupied blocks 32 during each update procedure; only the newly marked ones need to be considered to update their surroundings. It is not necessary to update the surrounding exploration blocks with the min distance and direction if the block has already been set to occupied before.

For all exploration blocks 322 in a defined radius 320 around one or more occupied blocks 32, the distance(s) 325 to these one or more occupied blocks 32 are determined. If such a determined distance 325 is smaller than the minimum distance stored in the exploration block, the minimum distance and the direction are updated. Therefore, subsequently, every exploration block with detected objects in the vicinity will have stored an approximate distance and direction to the nearest detected object. This information is later used to find the optimal path for object scanning and for orienting the drone towards the objects in order to reach high scan density. Optionally, multiple directions and distances (closest, second closest etc.) or other information regarding the occupied blocks in the neighborhood (e.g., roughness of object, details in surface etc.) might be stored to further optimize path planning and scanning, e.g., by adapting flight speed and orientation.

As illustrated in FIG. 6*c*, for each occupied exploration block that lies completely or partly in the past field of view 15', corresponding cone information are extracted and stored. The map 3 is not shown in FIG. 6*c* for clarity reasons. This cone information includes the cone's half-aperture angle $\alpha_{occ}$ and the direction $dir_{occ}$ from the center of the field of view 15' to the center of the occupied block 32, as well as the respective distance $\alpha_{occ}$. Next, for all yet unknown exploration blocks lying completely within the past field of view 15', the respective cone information (including half-aperture angle $\alpha$, direction dir, and distance d) is extracted. It is determined, based on the cone information, if the respective block is fully or partially hidden by any occupied exploration block 32 stored before. The exploration block is considered "hidden" or "occluded", if for any occupied block 32, $d > \alpha_{occ}$ and $\delta < (\alpha + \alpha_{occ})$, where $\delta$ is the angle between the cone directions dir and $dir_{occ}$. In other words, if the respective unknown block is (was) farther away from the laser scanner than the occupied block and if their cones overlap, it is (was) hidden behind the occupied block 32. Only non-hidden exploration blocks are then marked as free blocks 31, whereas fully or partially hidden exploration blocks remain unknown blocks 33.

Figure 7:
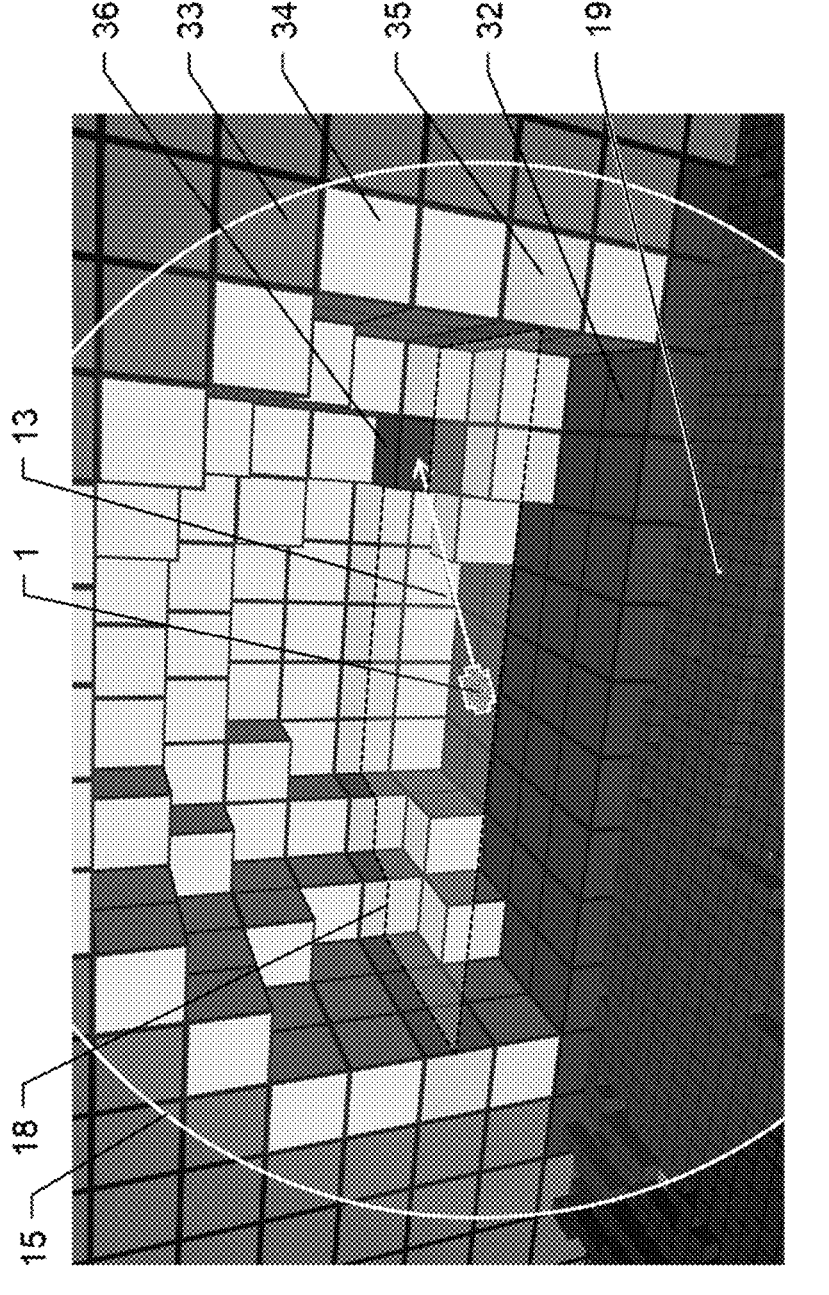
FIG. 7 illustrates an exemplary exploration planning process.

FIG. 7 illustrates an exploration planning process that directly follows the exploration map update process described above. FIG. 7 shows the UAV 1 with its field of view 15 inside the exploration map (volume). Free blocks (not comprising any scanned features) are not shown here for clarity reasons. On the bottom, the laser scanner has detected features and captured these as a map 19 of the environment ("global main occupancy map"). Within the exploration map, these features are not visible, since they are overlaid with exploration blocks that have been marked as occupied blocks 32 (occupied because they comprise these detected features). Unknown blocks 33 lie outside the field of view 15 or are hidden behind occupied blocks 32.

For all free blocks 31 it is determined whether they border one or more unknown blocks 32. If so, the free block 31 is marked as a "frontier" block 34-36. Each frontier block 34-36 is free and at the border to the unknown space. The index of each frontier block 34-36 is stored, for instance in a current frontier exploration block index array.

Since frontier blocks 34-36 are free (therefore reachable) and border the unknown space, they serve as possible flight targets for the UAV 1. The main task of the exploration planner is to select the best frontier block 36 as a next flight target for the UAV 1. The selection may be done by assigning a cost/score to every frontier block 34-36 based on, e.g., the distance to the current UAV position, the distance to objects, etc.

Optionally (as described in detail further below with respect to FIGS. 11 to 15), the list of possible frontier blocks 34-36 could be also extended with free exploration blocks that do not necessarily touch the unknown space, but are in a certain relative position from occupied exploration blocks 32. This improves path planning and allows a more even scanning resolution of objects. Optionally, additional metrics could be taken for selecting a block as flight target. For instance, only blocks in a certain distance which provide a good viewpoint onto the surface of the object could be considered as possible flight targets.

The update of the exploration map is triggered as described above. For instance, the exploration planner may trigger the update. Alternatively, the exploration map could also perform its updates independently and the planner just pulls a snapshot of the map every time it needs it. For instance, the exploration map could be hosted in the cloud, and multiple sensors/robots could update it in parallel. Each planner of the robots would then just pull the current state of the exploration map from the cloud for doing its respective path planning.

Every time the update of the exploration map has been triggered, the exploration planner then runs the following process. For instance exploration map updates may trigger the process in a continuous, regular loop (e.g., every 500 ms).

First, it is determined whether the UAV 1 has reached its previous exploration planner goal, i.e., has finished (or is about to finish) its flight to the centre of a previously given frontier block 34-36. If this is the case, the current frontier blocks 34-36 are retrieved from the updated exploration map and graded based on different weighted metrics. For instance, these metrics may comprise a current distance between the respective frontier block 34-36 and the UAV 1 and/or the next occupied block 32. In order to get a smooth flight trajectory the next goal to fly to may be calculated slightly before reaching its goal to avoid stopping.

Next, from all graded frontier blocks 34-36 the highest graded frontier block 36 is extracted, i.e., the frontier block with the highest overall score. A mission to fly to the centre point of the highest graded frontier block 36 is sent to the global path planner engine of the UAV 1. The global path planner engine plans a path 13 to move the UAV 1 to the highest graded frontier block 36 while avoiding obstacles on the way. Preferably, smooth and continuous scan trajectories should be calculated, avoiding stops during the flight. The sent mission advantageously may also define a desired target orientation of the UAV 1 at the goal position. Since the direction to the closest occupied block 32 has been stored in the blocks during the exploration map update, the desired target orientation can be set into the direction to the closest occupied block 32.

Also a relative vertical distance between the respective frontier block 34-36 and the UAV 1 can influence the score, since shorter vertical distances between the respective frontier block 34-36 and the UAV 1 generally leads to more horizontal exploration before vertical exploration. A vertical height level 18 of the UAV 1 is indicated in FIG. 7. Frontier blocks 35, 36 lying in the same level 18 may be graded higher than those above or below the level 18 to save battery power of the UAV 1.

Optionally, the exploration map 3 and/or the planning could be hosted in a cloud and could be updated by multiple autonomous UAVs and other mobile robots. Also, stationary laser scanners might be used in addition to mobile robots. This solution allows autonomous collaborative exploration-based volume scanning.

Also indoor environments, like interiors of buildings, manufacturing halls, cave systems etc., can be explored. For example, the UAV could be placed in a cave system, and a big exploration volume could be defined around the cave system. When executing the exploration, the UAV 1 would then try to explore the unknown space in the cave system while scanning it. Volume outside the cave would stay unknown as it would not be reachable and observable by the UAV 1 in the cave. The volume outside the cave (e.g., ground or mountain) is unknown and the UAV does not try to observe it because there are no frontier blocks (free blocks neighbouring unknown space) outside the cave in the mountain/ground. The unknown space outside the cave is neighboured by occupied blocks only.

Optionally, the autonomous exploration process can be paused, so that a user can control the UAV and explore the scene manually, e.g., via joystick control. Since the exploration map is continuously updated (e.g., also during a paused state), the autonomous mode can be re-entered at any time, incorporating the current state of the exploration map. The UAV 1 can be also landed during the exploration, for instance to exchange the battery, and the exploration can be resumed afterwards.

Figure 8:
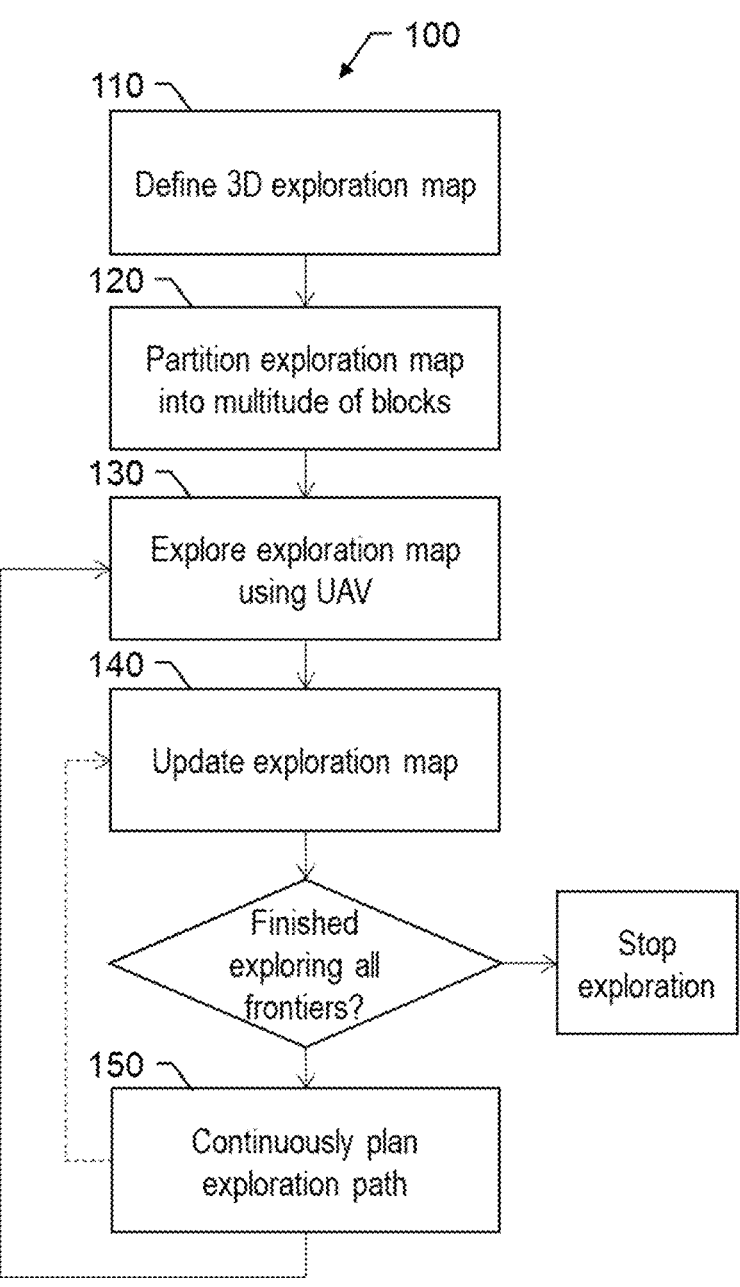
FIG. 8 is a flow chart illustrating an exemplary embodiment of a method for autonomously exploring objects of interest by a UAV.

FIG. 8 is a flow chart illustrating an exemplary method 100 for autonomously exploring one or more objects of interest by an unmanned aerial vehicle (UAV). As described above, the UAV comprises a computing unit and a laser scanner module for scanning surfaces of the one or more objects of interest. A field of view of the laser scanner may be limited by a maximum scanning range and by a position and orientation of the laser scanner module, e.g., rotors. Typically, the maximum scanning range is between 15 and 150 metres, particularly between 40 and 80 metres.

In a first step a three-dimensional exploration map, i.e., a volume, is defined 110 around the one or more objects of interest by a user. This user-defined exploration map is then partitioned 120 into a multitude of three-dimensional exploration blocks. For instance, a size of the exploration blocks may be selected based on the size of the object of interest and the size of its smallest explorable features. The size of the exploration blocks usually is a trade-off between computational efficiency and the completeness of the resulting scan: the smaller the exploration blocks the more complete the scan. For instance, if each exploration block would have an edge length of 3 metres, this would be too large for exploration within a small building or cave, since basically all reachable exploration blocks would be occupied blocks. In case of openings, such as holes in a wall, the exploration block size would have to be chosen small enough, such that exploration of unknown blocks behind the opening can be ensured. For instance, if a circular hole has a diameter of 1 metre, the block size should be selected to be smaller than 0.447 metres.

Optionally, the user may be allowed to change or update the volume selection during the ongoing exploration, or during a pause of the exploration. This may include moving the volume selection, for instance vertically up or down. This may also include extending or decreasing the volume, for instance if the user recognizes that the volume needs to be increased to scan an important part of an object, which would otherwise not be included. Existing exploration blocks which are still within the newly created volume keep their actual status from before the update, e.g., free, occupied, unknown etc). The parts of the volume which was not covered by the previous volume is filled up with exploration blocks with unknown status.

The UAV then performs a fully autonomous exploration 130 of the defined and partitioned exploration map. This exploration 130 comprises the laser scanner module of the UAV generating scan data of the objects of interest (and other objects in the user-defined volume) while the UAV flies along an exploration path through the volume until all of the volume's exploration blocks either have been explored or determined to be unreachable. In particular, the exploration is finished if there are no more blocks in the list of possible flight targets, i.e., there are no frontier blocks left and all other optional flight targets have been resolved.

Exploring an exploration block at least comprises determining, based on the scan data, whether the respective exploration block comprises a surface.

While the exploration 130 is ongoing, the computing unit of the UAV continuously updates 140 the exploration map and continuously (re-) defines 150 the exploration path.

Figure 9:
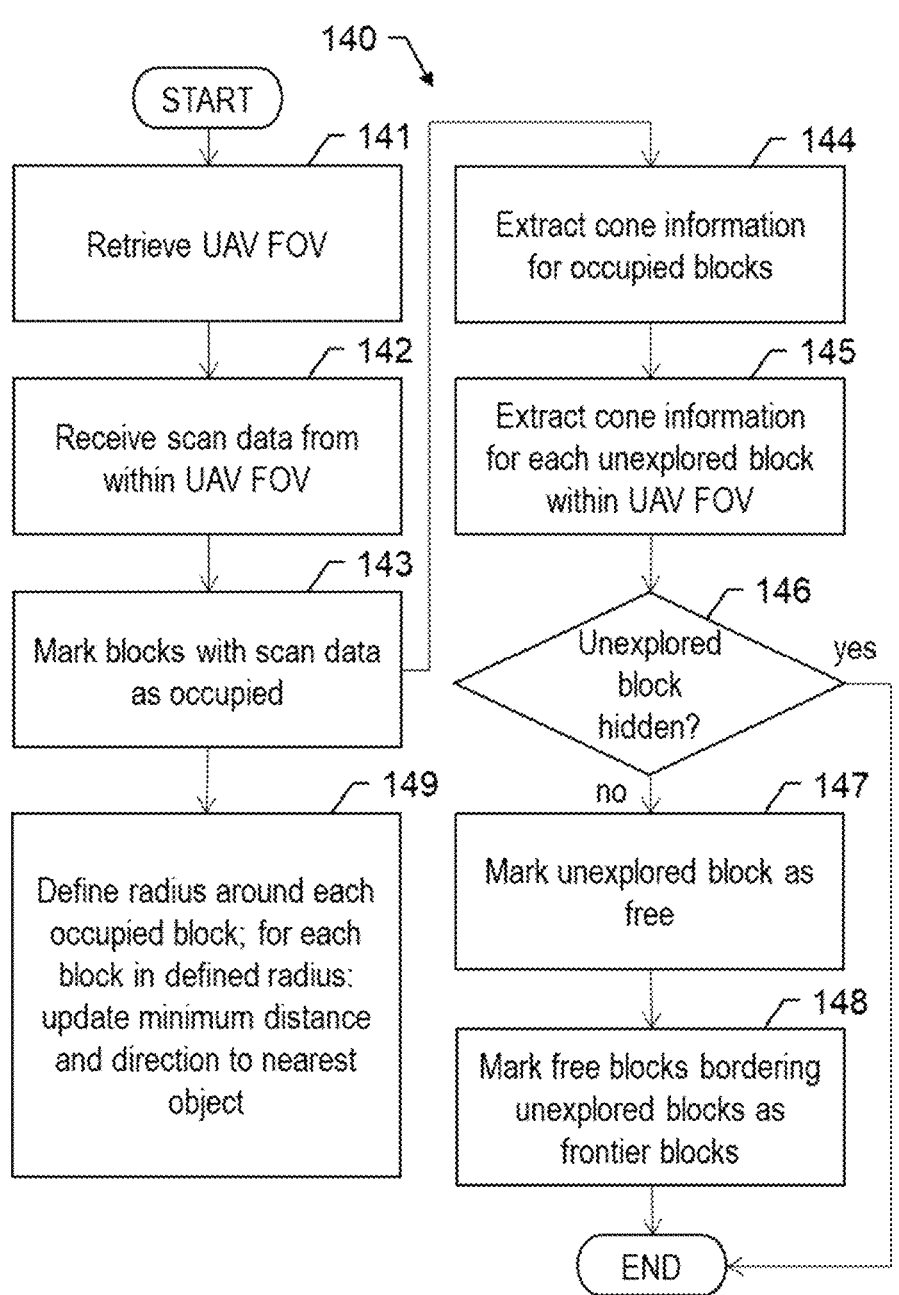
FIG. 9 is a flow chart illustrating an exemplary process of updating the exploration map as a part of the method of FIG. 8.

The flow chart of FIG. 9 illustrates an exemplary embodiment of the map updating process 140 of the method of FIG. 8. The updating process 140 is repeated for a multitude of points in time, e.g., every 500 ms.

In the exemplary embodiment shown here, it starts with retrieving 141 information about the field of view of the UAV's laser scanner (FOV information) from the past. For instance, parts of this information can be provided as a predefined value set in a memory of the UAV's computing unit or be retrieved as actual data in a test run before the actual scanning process (e.g., the actual volume definition of the FOV may be predefined via parameters and can be stored in the memory). The FOV defined as a spherical volume is constant. However, as the laser scanner moves, the FOV has different poses (position and orientation) over time. The algorithm buffers these poses of the laser scanner within the last x seconds. This grants access to the pose x seconds ago from the current moment. The FOV information may comprise information about a maximum scanning range. However, the field of view used in the algorithm can have a smaller radius than the real field of view, i.e., than the maximum scanning range (the used field of view must be included in the physical field of view). Optionally, also information about obstructions of the field of view may be part of the FOV information, i.e., about those parts of the UAV in the field of view that prevent the scanner from providing a full-dome scan.

Next, information from the occupancy map is retrieved 142. The volume of the field of view some milliseconds ago (past FOV) is known. For each exploration block completely or partly within this past FOV it is determined if the occupancy map holds objects, i.e., occupied blocks, within this respective exploration block volume. If so, the respective exploration blocks are then marked 143 as occupied blocks.

For each of the blocks that has been marked occupied and lies within the field of view, the respective cone information is extracted 144. Likewise, for each block that is still unknown (and completely lies within the past field of view), i.e., that has not yet been marked either free or occupied, the respective cone information is extracted 144. The cone information relates to a cone defined by the position of the UAV's laser scanner module at the respective point in time and by the boundaries of the respective block. In particular, the cone information comprises at least a direction and an aperture (or half-aperture) angle.

It is then determined 146 for each of the unexplored blocks in the field of view (i.e., completely in the field of view) based on the extracted cone information (i.e., the cone information of the respective unexplored block and the cone information of all the occupied blocks completely or partly in the field of view), whether the respective unexplored block is at least partially hidden by one or more of the occupied blocks. If the unknown block is not hidden, it is marked 147 as free block, otherwise it remains an unknown block for the time being. After these two steps 146, 147 have been executed for each unexplored block in the field of view (i.e., once it is clear which block is occupied, free or unexplored) free blocks that border unknown blocks are additionally marked 148 as frontier blocks.

Each exploration block can store its (minimum) distance and direction to the closest occupied block. These values may be updated 149 during each updating process 140. However, only the values of those exploration blocks close to a recently set occupied exploration block need to be updated. Usually, there is no need to always update the surrounding around all current occupied exploration blocks. Specifically, for each exploration block that lies in a certain radius around one or more occupied blocks, the stored distance and direction to the closest occupied block will be updated 149. This includes, for all exploration blocks in a defined radius around one or more occupied blocks the distance(s) to these one or more occupied blocks are determined (see FIG. 6b). If such a determined distance is smaller than the minimum distance stored in the exploration block, the minimum distance and the new direction are updated. The radius may be defined, e.g., based on the maximum or optimal scanning range of the laser scanner module and/or on a size of the exploration blocks. In short: Whenever a exploration block is set to occupied (and was not occupied before) the exploration blocks in the surrounding of this occupied block are updated. If the distance to the current occupied block is smaller than the minimal distance already stored, it is updated.

Also, the radius may be defined as a fraction of the maximum scanning range. For instance, the radius may be defined to be about four times (e.g., between three and five times) the length of an edge of an exploration block (i.e., $r \cong 4a$, where a is the blocks' edge length). Preferably, the radius should include at least the optimal scanning distance for objects. This ensures that the values of all exploration blocks are updated, which serve as possible flight targets for an optimal scan result. For instance, if the optimal scanning distance for objects is 4 m, and the maximum distance between neighboring exploration block centers is 2.5 m, then the radius should be at least 5 m, preferably even larger.

Figure 10:
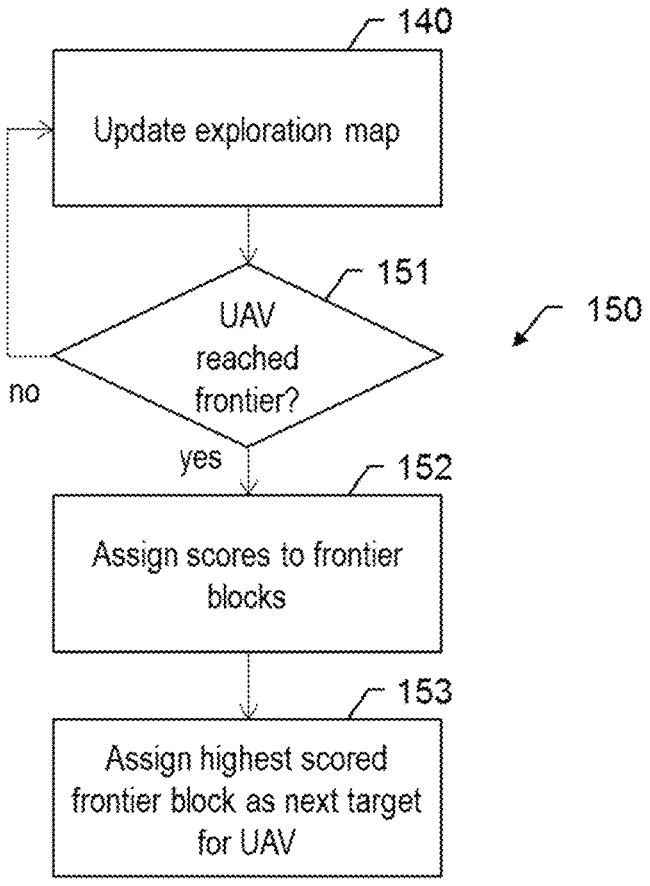
FIG. 10 is a flow chart illustrating an exemplary exploration planning process as a part of the method of FIG. 8.

The flow chart of FIG. 10 illustrates an exemplary embodiment of the path definition process 150 of the method of FIG. 8.

The process may be started after each map updating process 140 with a check 151 whether there is a previously assigned exploration target, i.e., a frontier block, that the UAV is still travelling to but has not reached yet. If the UAV has not reached the target, the path definition process 150 is discontinued and the next map updating process 140 is started.

If the UAV has (almost) reached the target (or if there is no such target), path definition process 150 continues with assigning 152 scores to the frontier blocks. That frontier block that has been assigned the highest score is defined 153 as the next exploration target for the UAV, i.e., the UAV is sent to fly to this frontier block next. Optionally, also other free blocks that serve as a good scan position may serve as next exploration targets.

Defining 153 the next exploration target optionally also comprise defining an orientation of the UAV at the target position. For instance, the orientation may be set to coincide with the direction to the closest occupied exploration block-said direction having been stored in the block during the exploration map update. Alternatively, the UAV may be oriented to provide the mounted scanner the best possible view onto the object, i.e., so that the side of the UAV comprising the scanning module faces the object to be scanned.

For instance, the scores may be assigned 152 based on:
   a) a current distance between the respective frontier block and the UAV;
   b) a distance between the respective frontier block and the nearest occupied blocks; and/or
   c) a relative vertical distance between the respective frontier block and the UAV.

Shorter distances from the UAV to the next target usually result in a more efficient exploration and overall flight path. Regarding the distance between the respective frontier block and the nearest occupied blocks, the highest scores are assigned to distances that are closest to an optimal scanning distance of the laser scanner. Depending on the selected block size, this often means the shorter the respective distance, the higher the assigned score. Only if the distance lies below an optimal scanning distance, a higher score may be assigned to longer distances. Shorter distances to the next occupied block generally result in a flight path that is closer to scannable objects and are therefore prioritized over exploring unknown space far away from known objects. The distance to the closest exploration block has been stored in the blocks during the exploration map update and now may be used for assigning 152 the scores.

Shorter vertical distances between the respective frontier block and the UAV (i.e., scoring frontier blocks on the same altitude level higher than those from levels above or below) generally leads to more horizontal exploration before vertical exploration. This prevents random upwards and downwards flying, thus saving battery power and extending the maximum flight time of the UAV.

Optionally, as illustrated with respect to FIGS. 11 to 14a-c, the method for autonomously exploration may be further improved to ensure an optimized scanning of the surfaces of the object or objects of interest. Whereas the method described above ensures a complete exploration of the volume, certain surfaces of the objects in the volume might not be scanned optimally—i.e., because they have been scanned with a very flat angle of incidence and/or from a distance that is not an optimal scan distance.

Figure 11:
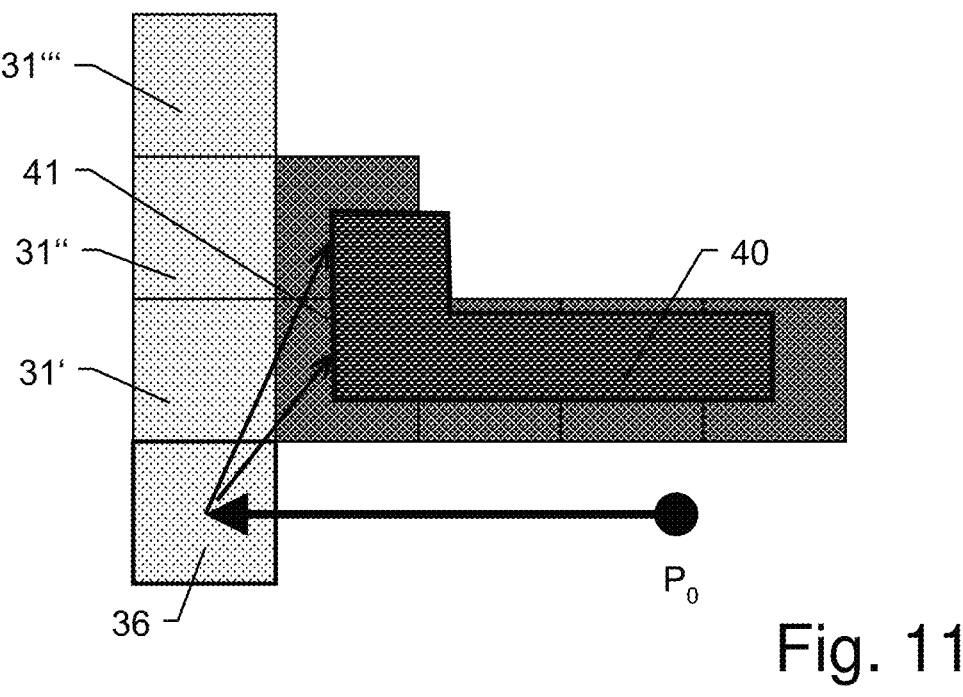
FIG. 11 illustrates a first example of a scanning position leading to a bad scanning result.
Figure 12:
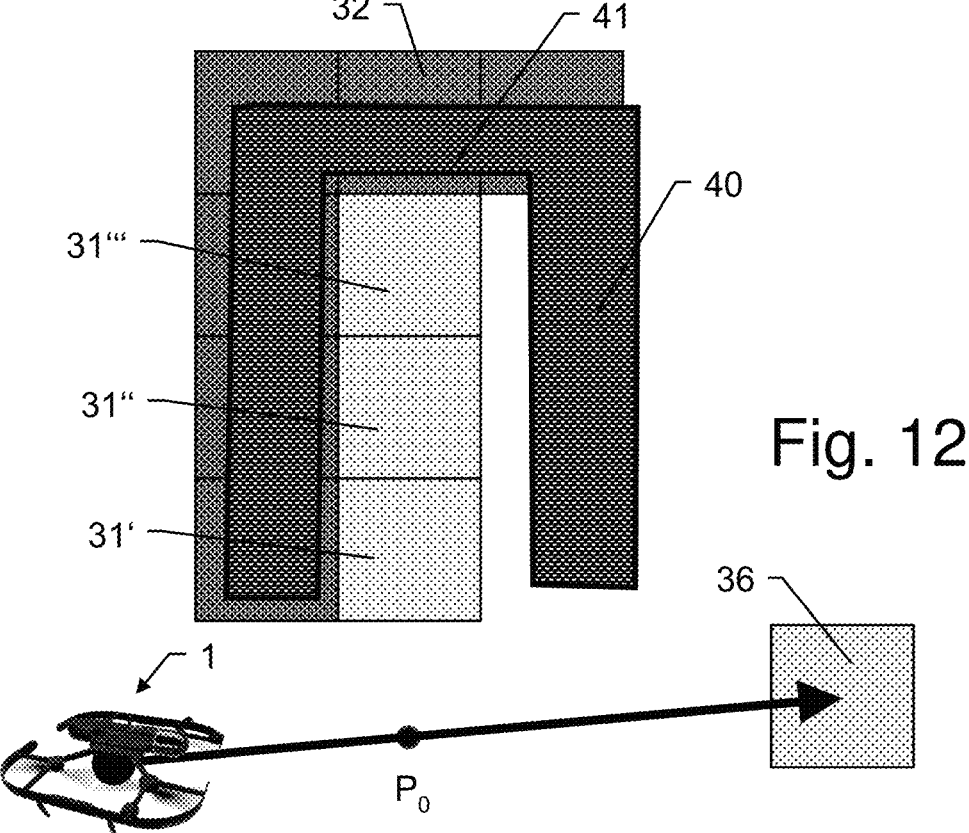
FIG. 12 illustrates a second example of a scanning position leading to a bad scanning result.

FIGS. 11 and 12 show two examples that illustrate these limitations. In FIG. 11 the UAV is located at an edge of an L-formed object 40 at position $P_0$. The planner selects frontier block 36 as next flight target, and the UAV flies there. When the UAV enters frontier block 36, the three previously unknown exploration blocks 31', 31", 31''' above frontier block 36 (assuming they are located in the lidar FOV) have been set to free. However, the location at the centre of frontier block 36 does not provide a good scanning location for the surface 41 of the object 40, as the laser beams hit the surface 41 in relatively large angles of incidence. Assuming a constant angle between consecutive measurements of the LiDAR, e.g., 0.5 degree (sampling resolution), the scan resolution of the surface is low. The location at frontier block 36 might also be relatively far away from parts of the surface 41. Consequently, selecting the closest frontier block as the next flight target does not always lead to a close fly-by of the respective surface, thus resulting in a low scan resolution of this surface. In FIG. 12 the UAV 1 flies to the centre of frontier block 36, which has been selected as the next flight target. While flying there, the UAV 1 passes an indentation of the object 40. At position $P_0$ all previously unknown exploration blocks 31', 31", 31''' in the indentation would be set to free and previously unknown block 32 would be set to occupied (assuming that block 32 is still inside the field of view). In this case, the surface 41 in occupied block 32 would not be scanned in an optimal way as it is not in the optimal scanning distance.

Figure 13:
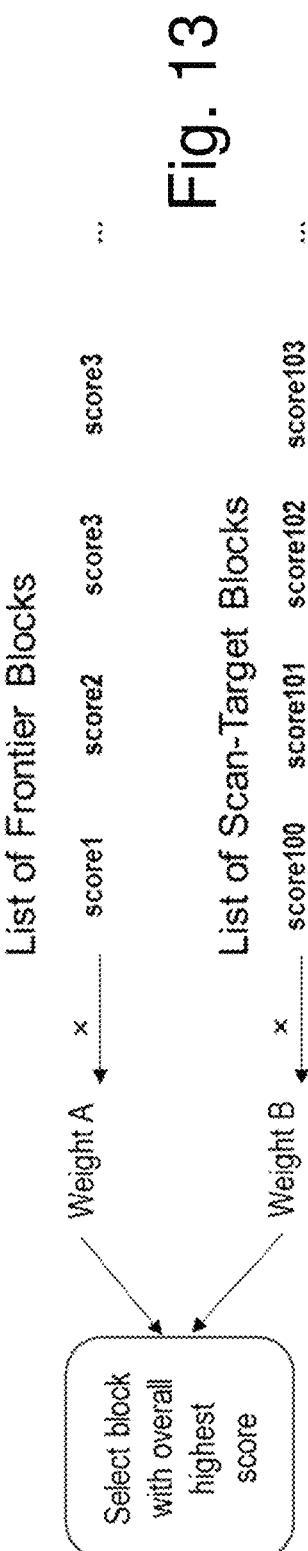
FIG. 13 illustrates selection of a next flight target based on assigned scores and weights.

The problems illustrated in FIGS. 11 and 12 may be solved by adding a list of scan-target exploration blocks to the list of frontier exploration blocks. This is illustrated in FIG. 13.

The list of scan-target exploration blocks comprises blocks that are free and provide a good and occlusion-free scan position for scanning an object. In each list, the blocks receive a score depending on how well they are suited as next flight target for the UAV. The planner selects from both lists the block with the highest score, i.e., that block that is considered the optimal next exploration block to fly to.

Optionally, when selecting the next exploration block to fly to from both lists, the scores in the individual lists may be multiplied by a weight given to the respective list (here: "Weight A" and "Weight B"). By setting different values for these weights, the behaviour can be adjusted to be more exploration-focused or more scan-quality focused. For instance, the behaviour of the base method can be restored by setting "Weight B" to zero.

Figure 14A:
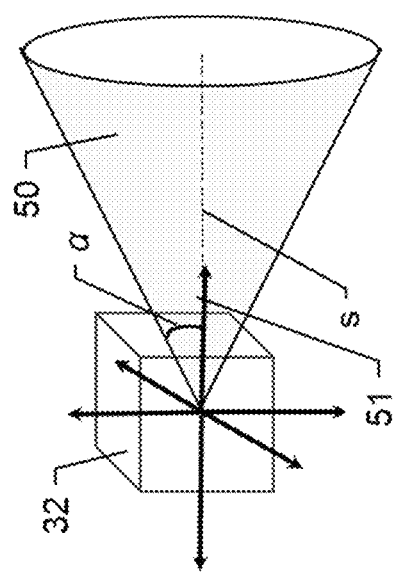
FIG. 14a-c illustrate defining scan-target blocks.
Figure 14B:
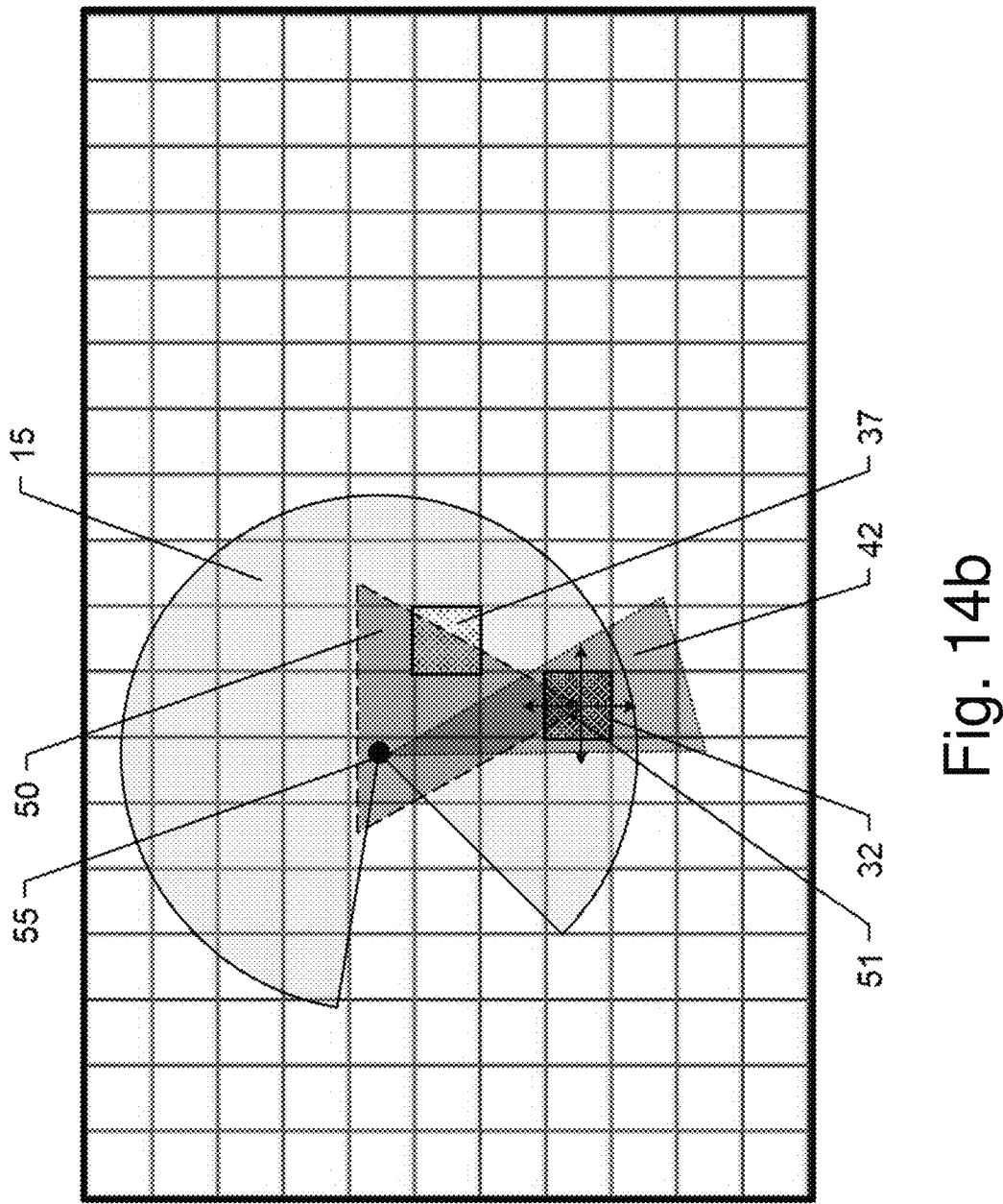
Figure 14C:
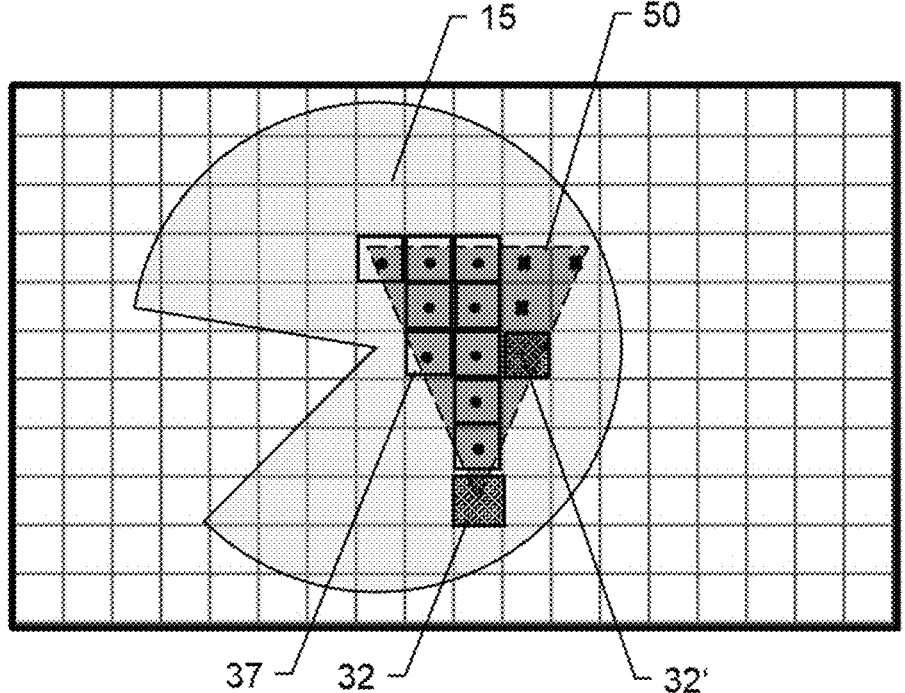

FIGS. 14a to 14c illustrate the use of surface-scan-cone objects for the definition of scan-target blocks. Whenever an exploration block is set to occupied in an exploration-map update, a set of surface-scan cones 50 will be defined for this occupied block 32. The surface-scan cones 50 can be placed in multiple ways. For instance, the cones may be placed according to one or more surface normals of objects detected within the occupied exploration block 32. This approach requires continuously observing the actual structure within occupied exploration blocks 32 and extracting not yet optimally scanned surface normals, as the detected structure might not be complete from the beginning.

Alternatively, as shown in FIG. 14a, the surface-scan cones 50 can be placed without considering the actual structure within the occupied block 32. Once an exploration block is set to occupied, a fixed set of surface-scan cones 50 with defined directions can be created for the occupied exploration block. The defined directions are always the same for all occupied exploration blocks. In the case of cubic exploration blocks, as shown in FIG. 14a, the set of surface-scan cones usually consists of six cones 50—although only one cone is shown here for clarity. As shown, for every occupied exploration block 32, six surface-scan cones 50 may be defined that are aligned with the exploration block grid axes—i.e., four horizontally with 90 degrees difference, one up and one down. Of course, more surface-scan cones 50 may be added (e.g., every 45 degrees) to further increase the scan results (or the possible quality of the scan results). Each surface-scan cone 50 is defined by a normal vector 51, a maximum angle of incidence a (alpha) and a maximum scanning distance s (s and a are parameters, wherein s must be smaller than the radius of the laser scanner's field of view).

FIG. 14b illustrates the flagging of surface-scan cones 50 as being scanned. Each surface-scan cone 50 comprises a flag indicating whether the scan condition has been fulfilled or not. Initially, the scan-condition flag is set to false, i.e., "not yet scanned". The surface-scan cone 50 is flagged as scanned if the centre 55 of the laser scanner's field of view 15 enters the surface-scan cone 50 and had an occlusion-free view onto the related occupied exploration block 32. In each exploration-map update, the scan condition is checked for all not-yet-scanned surface-scan cones 50 of occupied exploration blocks 32 that are located at least partially in the current field of view 15 of the scanner module of the UAV. As also shown in FIG. 14b, a free block, whose centre point is located in a surface-scan cone 50 and which provides an occlusion free view onto the related occupied exploration block 32, is defined as "scan-target exploration block" (or "scan-target block") 37. At the end of each exploration-map update (or when otherwise needed by the planner), the list of possible scan-target exploration blocks of 37 all not-yet scanned surface-scan cones 50 within the exploration map is collected.

FIG. 14c illustrates the definition of scan-target blocks 37 in more detail. In this example, a second occupied block 32' is located in the surface-scan cone 50 of occupied block 32. Scan-target exploration blocks 37 are those nine blocks that are marked with a black centre. For the specific surface-scan cone 50 shown here, those three blocks having a crossed-out centre are not defined as scan target exploration blocks. Although their centres are located in the surface-scan cone 50, they do not necessarily provide an occlusion-free view onto the related occupied exploration block 32, since the second occupied exploration block 32' at least partially blocks the view.

In each scan-target exploration block 37, the distance and direction to the specific occupied exploration block 32 (can be also multiple occupied exploration blocks) are stored. Furthermore, a counter is stored and increased, counting the number of surface-scan cones 50 in which the specific scan-target exploration block lies. Alternatively, a vector/list of the related occupied exploration block indices may be stored in the scan-target exploration blocks 37. From the index, the distance and direction can be computed. From the length of the vector/list of indices the number of surface-scan cones can be computed, in which the specific scan-target exploration block 37 lies.

Since, geometrically, the surface-scan cones 50 are the same for every occupied block 32, the relative indices of the exploration blocks within the surface-scan cone 50 can be predefined (i.e., it is known which exploration block centres lie in the cones), which increases algorithmic efficiency. When the list of possible scan-target blocks 37 is collected, this is iterated over all not-yet-scanned surface-scan cones and over the related predefined exploration block indices, checking if they are free and offer an occlusion-free view onto the related occupied block 32. Those blocks that fulfil the condition are put on the list.

The individual scan-target exploration blocks 37 may be scored similarly to the frontier blocks. However, additionally, they are scored with the stored distance(s) to the occupied exploration block(s), wherein an optimal scanning distance is scored the highest. Furthermore, scan-target exploration blocks 37 are scored higher if they are located in multiple surface-scan cones 50, i.e., the more cones are covered, the higher is the assigned score. The counter value described above may be used for this score. The UAV flying to a scan-target block 37 that is included in multiple surface-scan cones 50, flags all of them as scanned at the same time and thereby increases the efficiency of the exploration.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A computer-implemented method for autonomously exploring, by a mobile robot, one or more objects of interest, the mobile robot comprising a computing unit and a laser scanner module for scanning surfaces of the one or more objects of interest, the laser scanner module having a field of view, comprising:

defining a three-dimensional exploration map, wherein the one or more objects of interest are situated in the exploration map;

partitioning the exploration map into a multitude of three-dimensional exploration blocks; and an autonomous exploration of the exploration map by means of the mobile robot, wherein the exploration of the exploration map comprises the mobile robot exploring, along an exploration path, at least a subset of the exploration blocks, and the laser scanner module generating scan data while the mobile robot is travelling along the exploration path, wherein:

exploring an exploration block at least comprises determining, whether the respective exploration block comprises one or more points of a point cloud; and the computing unit of the mobile robot updates the exploration map and defines the exploration path, wherein updating the exploration map comprises, at each of a multitude of distinct points in time:

retrieving scan data generated by the laser scanner module;

identifying, based on the retrieved scan data, exploration blocks that lie at least partly in a past field of view and comprise one or more points of the point cloud, wherein the past field of view is the field of view of the laser scanner module of a previous point in time that precedes the respective point in time of the multitude of distinct points in time;

defining the identified exploration blocks as occupied blocks;

extracting cone information for each of the occupied blocks that lie at least partly in the past field of view, the cone information relating to a cone defined by a position of the laser scanner module at the respective previous point in time and by boundaries of the respective occupied block;

extracting cone information for each unexplored block that fully lies in the past field of view, the cone information relating to a cone defined by the position of the laser scanner module at the respective previous point in time and by boundaries of the respective unexplored block; and determining for each of the unexplored blocks that lie fully in the past field of view, based on the cone information of the respective unexplored block and on the cone information of the occupied blocks that lie at least partly in the past field of view, whether a line of sight between a center of the past field of view and at least a part of the respective unexplored block is blocked by one or more occupied blocks.

2. The method according to claim 1, wherein the mobile robot is an unmanned aerial vehicle (UAV), particularly a quadcopter drone.

3. The method according to claim 2, wherein the field of view depends on a position and orientation of the UAV and is limited by:

a position and orientation of the laser scanner module relative to the UAV, and a pre-defined radius that is smaller than a maximum scanning range of the laser scanner module, wherein the field of view is also limited by a the position and orientation of the laser scanner module relative to other features of the UAV, particularly wherein the other features at least comprise rotors and/or wings of the UAV; and/or the maximum scanning range of the laser scanner module is between 15 and 150 metres, particularly between 40 and 80 metres.

4. The method according to claim 1, wherein updating the exploration map is performed in time intervals that are selected depending on at least one of:

a scanning speed of the laser scanner unit, a computing speed of the computing unit, and a current speed of the mobile robot, wherein the time intervals are between 100 ms and 1s.

5. The method according to claim 1, wherein determining whether a line of sight is blocked comprises determining whether the cone of the respective unexplored block overlays with one or more cones of the occupied blocks, and if it overlays, determining whether a distance from the center of the past field of view to the center of the respective unexplored block is bigger than a distance from the center of the past field of view to the center of the respective occupied block.

6. The method according to claim 1, wherein information regarding a minimum distance and a direction to the nearest occupied block or nearest point of the point cloud is stored for each exploration block, and updating the exploration map further comprises:

for each block that has been defined as occupied block in the latest distinct point in time, determining a distance and direction between the respective occupied block and each not occupied exploration block in a defined radius around the respective occupied block; and if the determined distance is smaller than the stored minimum distance for that block, updating the stored minimum distance and direction with the determined distance and direction, wherein the radius is defined based on a maximum or optimal scanning range of the laser scanner module and/or on a size of the multitude of three-dimensional exploration blocks.

7. The method according to claim 1, wherein updating the exploration map further comprises:

defining unexplored blocks that lie fully in the past field of view, the cone of which unexplored blocks do not overlay with one or more cones of the occupied blocks, as free blocks;

defining free blocks that border unexplored blocks as frontier blocks, wherein defining the exploration path comprises assigning scores to the frontier blocks; and assigning a next exploration target for the mobile robot based on the scores assigned to the frontier blocks, particularly wherein the highest-scored frontier block is assigned as next exploration target, wherein the scores are assigned based at least on one or more of:

a distance between the respective frontier block and one or more occupied blocks;

an overall distance and/or a relative vertical distance between the respective frontier block and a current position of the mobile robot; and a number of occupied blocks within a defined radius around the respective frontier block.

8. The method according to claim 7, wherein defining the exploration path comprises:

defining a subset of free blocks that are not frontier blocks as scan-target blocks, and assigning scores also to the scan-target blocks, wherein assigning the next exploration target for the mobile robot is based on the scores assigned to the frontier blocks and on the scores assigned to the scan-target blocks, wherein the highest-scored block is assigned as next exploration target, wherein scores are assigned to the scan-target blocks based on their position relative to a surface of an object of interest and its potential for providing good scanning results.

9. The method according to claim 8, wherein assigning scores comprises assigning frontier scores to the frontier blocks and assigning scan-target scores to the scan-target blocks, wherein a first weight is multiplied with each of the frontier scores and a second weight is multiplied with each of the scan-target scores, particularly wherein the first and second weight are user-selectable.

10. The method according to claim 8, wherein defining the scan-target blocks comprises:

defining, for each occupied block a multitude of surface-scan cones, and determining, for each free block which center point is located in a surface-scan cone, whether a line of sight to a part of the respective occupied block is blocked, wherein those free blocks, which center points are located in a surface-scan cone and which lines of sight to the respective occupied block are not blocked, are defined as scan-target blocks, wherein a surface-scan cone is flagged as explored when a center of the field of view enters the respective surface-scan cone.

11. The method according to claim 1, wherein a three-dimensional volume is defined by a user as the three-dimensional exploration map in a graphical user interface, wherein the graphical user interface:

is displayed on a screen of a mobile computing device; and/or shows a two-dimensional representation of the one or more objects of interest.

12. The method according to claim 11, wherein the graphical user interface allows the user to define a cuboid or other polyhedron as the three-dimensional exploration map by marking two corner points of the cuboid or other polyhedron.

13. The method according to claim 1, wherein exploring an exploration block comprises scanning, by the laser scanner module, particularly with a user-defined scanning accuracy, surfaces of objects present in the exploration block.

14. The method according to claim 13, wherein the one or more objects of interest comprise buildings or other man-made structures, and the surfaces include at least one of façades, roofs, pillars and pavement.

15. The method according to claim 13, wherein the one or more objects of interest comprise caves or other natural objects or scenes.

16. A computer program product comprising program code stored in a non-transitory machine-readable medium and having computer-executable instructions for performing the method according to claim 1.

17. An unmanned aerial vehicle (UAV) comprising a computing unit and a laser scanner module, the laser scanner module having a field of view, wherein the computing unit is configured:

a) to receive a three-dimensional exploration map that is partitioned into a multitude of three-dimensional exploration blocks, or b) to receive a three-dimensional exploration map and to partition the exploration map into a multitude of three-dimensional exploration blocks, or c) to receive exploration-map information, particularly comprising coordinates, to generate a three-dimensional exploration map based on the exploration-map information, and to partition the exploration map into a multitude of three-dimensional exploration blocks, wherein one or more objects of interest are situated in the exploration map, and wherein the computing unit is configured to control an autonomous exploration of the exploration map by means of the UAV, wherein the exploration of the exploration map comprises the UAV exploring, along an exploration path, at least a subset of the exploration blocks, and the laser scanner module generating scan data while the UAV is travelling along the exploration path, the scan data relating to a point cloud, wherein:

exploring an exploration block at least comprises determining, based on the scan data, whether the respective exploration block comprises one or more points of the point cloud; and the computing unit of the UAV is configured to update the exploration map and to define the exploration path, wherein updating the exploration map comprises, at each of a multitude of distinct points in time:

retrieving scan data generated by the laser scanner module;

identifying, based on the retrieved scan data, exploration blocks that lie at least partly in a past field of view and comprise one or more points of the point cloud, wherein the past field of view is the field of view of the laser scanner module of a previous point in time that precedes the respective point in time of the multitude of distinct points in time;

defining the identified exploration blocks as occupied blocks;

extracting cone information for each of the occupied blocks that lie at least partly in the past field of view, the cone information relating to a cone defined by a position of the laser scanner module at the respective previous point in time and by boundaries of the respective occupied block;

extracting cone information for each unexplored block that fully lies in the past field of view, the cone information relating to a cone defined by the position of the laser scanner module at the respective previous point in time and by boundaries of the respective unexplored block; and determining for each of the unexplored blocks that lie fully in the past field of view, based on the cone information of the respective unexplored block and on the cone information of the occupied blocks that lie at least partly in the past field of view, whether a line of sight between a center of the past field of view and at least a part of the respective unexplored block is blocked by one or more occupied blocks.

18. A system for scanning surfaces of one or more objects of interest, the system comprising a UAV according to claim 17 and a mobile computing device, wherein the mobile computing device is configured to receive user-input defining the three-dimensional exploration map, wherein the one or more objects of interest are situated in the exploration map, and to provide the exploration map or exploration-map information, particularly comprising coordinates, to the UAV.

19. A mobile robot comprising a computing unit and a laser scanner module, the laser scanner module having a field of view, wherein the computing unit is configured:

a) to receive a three-dimensional exploration map that is partitioned into a multitude of three-dimensional exploration blocks, or b) to receive a three-dimensional exploration map and to partition the exploration map into a multitude of three-dimensional exploration blocks, or c) to receive exploration-map information to generate a three-dimensional exploration map based on the exploration-map information, and to partition the exploration map into a multitude of three-dimensional exploration blocks, wherein one or more objects of interest are situated in the exploration map, and wherein the computing unit is configured to control an autonomous exploration of the exploration map by means of the mobile robot, wherein the exploration of the exploration map comprises the mobile robot exploring, along an exploration path, at least a subset of the exploration blocks, and the laser scanner module generating scan data while the mobile robot is travelling along the exploration path, the scan data relating to a point cloud, wherein:

exploring an exploration block at least comprises determining, based on the scan data, whether the respective exploration block comprises one or more points of the point cloud; and the computing unit of the mobile robot is configured to update the exploration map and to define the exploration path, wherein updating the exploration map comprises, at each of a multitude of distinct points in time:

retrieving scan data generated by the laser scanner module;

identifying, based on the retrieved scan data, exploration blocks that lie at least partly in a past field of view and comprise one or more points of the point cloud, wherein the past field of view is the field of view of the laser scanner module of a previous point in time that precedes the respective point in time of the multitude of distinct points in time;

defining the identified exploration blocks as occupied blocks;

extracting cone information for each of the occupied blocks that lie at least partly in the past field of view, the cone information relating to a cone defined by a position of the laser scanner module at the respective previous point in time and by boundaries of the respective occupied block;

extracting cone information for each unexplored block that fully lies in the past field of view, the cone information relating to a cone defined by the position of the laser scanner module at the respective previous point in time and by boundaries of the respective unexplored block; and determining for each of the unexplored blocks that lie fully in the past field of view, based on the cone information of the respective unexplored block and on the cone information of the occupied blocks that lie at least partly in the past field of view, whether a line of sight between a center of the past field of view and at least a part of the respective unexplored block is blocked by one or more occupied blocks.

20. A system for scanning surfaces of one or more objects of interest, the system comprising the mobile robot according to claim 19 and a mobile computing device, wherein the mobile computing device is configured to receive user-input defining the three-dimensional exploration map, wherein the one or more objects of interest are situated in the exploration map, and to provide the exploration map or exploration-map information to the mobile robot.

* * * * *